(12) United States Patent
McLoughlin et al.

(10) Patent No.: US 9,608,865 B2
(45) Date of Patent: Mar. 28, 2017

(54) METHOD, SYSTEM AND LOGIC FOR CONFIGURING A LOCAL LINK BASED ON A REMOTE LINK PARTNER

(71) Applicant: CISCO TECHNOLOGY, INC., San Jose, CA (US)

(72) Inventors: Bruce McLoughlin, Saratoga, CA (US); Yulianto Kokasih Ko, Fremont, CA (US); Qizhong Chen, Palo Alto, CA (US); Jyh Wen Simon Chen, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 282 days.

(21) Appl. No.: 14/327,085

(22) Filed: Jul. 9, 2014

(65) Prior Publication Data
US 2016/0013978 A1    Jan. 14, 2016

(51) Int. Cl.
*H04L 12/24*    (2006.01)
*H04L 25/14*    (2006.01)

(52) U.S. Cl.
CPC .......... *H04L 41/0813* (2013.01); *H04L 25/14* (2013.01); *H04L 41/083* (2013.01)

(58) Field of Classification Search
CPC . H03L 7/06; H04L 7/02; H04L 7/0004; H04L 12/44; H04L 12/40169;
(Continued)

(56) References Cited

U.S. PATENT DOCUMENTS 5,617,418 A      4/1997  Shirani et al.
RE39,405 E  *  11/2006  Edem ..................... H04L 12/44
                                                                    370/446
(Continued)

FOREIGN PATENT DOCUMENTS

WO    WO2016/007514    1/2016

OTHER PUBLICATIONS

"40/100 Gigabit Ethernet," Altera Corporation, ©1995-2014 Altera Corporation. All Rights Reserved. Published on or about Jan. 2010. 4 pages http://www.altera.com/technology/high_speed/protocols/40-100g-ethernet/pro-40-100g-ethernet.html.
(Continued)

*Primary Examiner* — Sargon Nano
*Assistant Examiner* — Michael Li
(74) *Attorney, Agent, or Firm* — Patent Capital Group

(57) ABSTRACT

Methods and systems are providing for configuring a port on a network device for communication with a port on a remote device. In one example, the network device receives, by a local port, a message from a physical coding sublayer (PCS) transmitter on the remote partner device. In one aspect, a port configuration module partitions the port to transfer data on a plurality of sub-ports each having a second data transfer rate if it is determined, by the network device that a local PCS receiver failed to align data received in the message. In another aspect, the port configuration module aggregates the plurality of sub-ports of the port to transfer data on a port having the first data transfer rate if it is determined, by the network device, that the local PCS receiver detected a code violation error in the message on at least one of the plurality of sub-links.

20 Claims, 7 Drawing Sheets

(58) Field of Classification Search
CPC . H04L 27/0008; H04L 41/08; H04L 41/0806; H04L 41/0823; H04L 41/0896; H04L 25/14; H04L 41/083; H04L 41/0813; H04L 43/0811; H04Q 3/0066
See application file for complete search history.

(56) References Cited

U.S. PATENT DOCUMENTS

| | | | |
|---|---|---|---|
| 2003/0058894 A1* | 3/2003 | Feuerstraeter | H03L 7/06 370/518 |
| 2008/0049788 A1* | 2/2008 | McClellan | H04L 27/0008 370/468 |
| 2013/0077623 A1 | 3/2013 | Han | |
| 2014/0003283 A1* | 1/2014 | Koenen | H04L 41/0896 370/254 |

OTHER PUBLICATIONS

Ganga, Ilango, et al., "IEEE 802.3ba 40 and 100 Gigabit Ethernet Architecture," IEEE ComSoc SCV, Oct. 2010, Santa Clara, CA; http://www.comsocscv.org/docs/Workshop_101310_StdArch.pdf.
PCT Oct. 21, 2015 International Search Report and Written Opinion from International Application Serial No. PCT/US2015/039380; 10 pages.

* cited by examiner

METHOD, SYSTEM AND LOGIC FOR CONFIGURING A LOCAL LINK BASED ON A REMOTE LINK PARTNER

TECHNICAL FIELD

This disclosure relates in general to the field of communications and, more particularly, to configuring one or more ports on a network element for communication with a port on another device.

BACKGROUND

Modern computing requires a vast amount of computing resources. For example, each of cloud computing, software as a service (SaaS), software defined networking (SDN) may rely on a large number of network elements connected to one another and configured to establish a network. Some network resources (e.g., processing power, storage) may be virtualized based on multiple physical elements, thereby allowing service providers to dynamically scale resources, e.g., based on demand. A data center may warehouse the physical elements used to virtualize network resources, however, establishing, and maintaining a data center can be costly. For example, time and resources are needed to physically connect two devices "back-to-back" (i.e., connecting a cable from the back of one device to the back of another device) and manually configure the devices for communication with one another. The potentially large number of devices—which may number in the thousands (or hundreds of thousands)—only exacerbates the required costs.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1A:
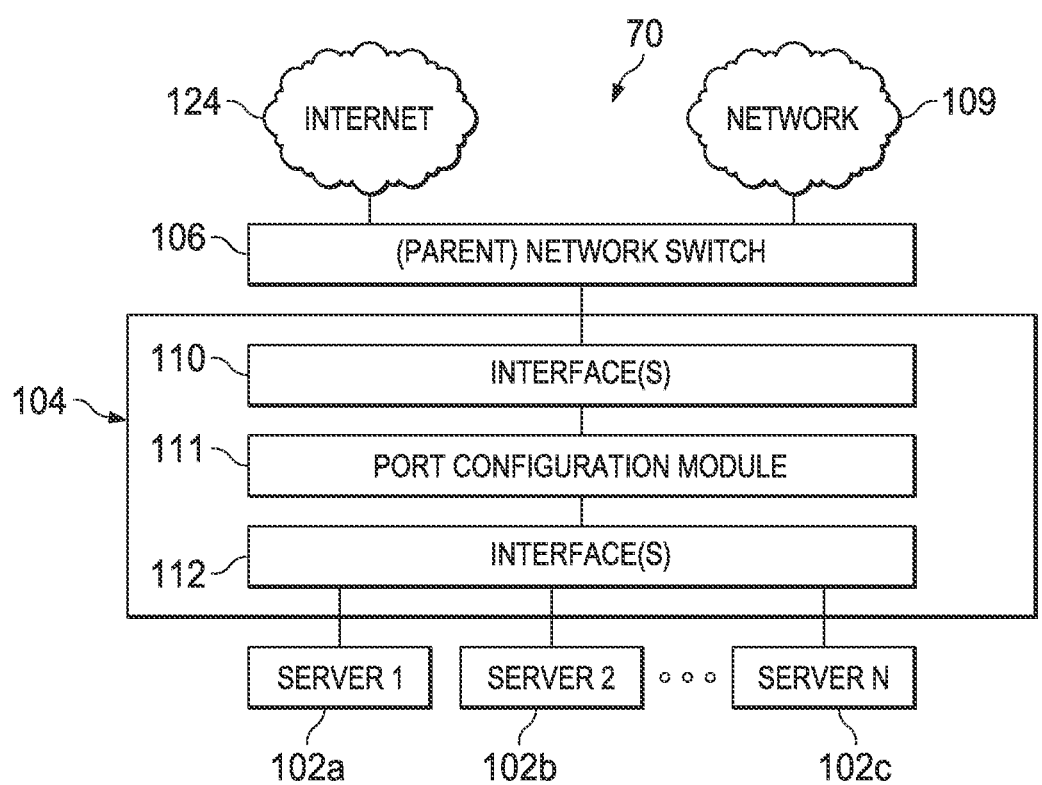
FIGS. 1A and 1B are simplified schematic diagrams of an embodiment of a system according the present specification.

In one example, a method for communicating between a network device and a remote partner device comprises receiving, by the network device via a local port, a message from a physical coding sublayer (PCS) transmitter on the remote partner device; determining, by the network device, a configuration of the local port; if the local port is configured to transfer data on a single link having a first data transfer rate: partitioning the port to transfer data on a plurality of sub-links each having a second data transfer rate if it is determined, by the network device, that a local PCS receiver failed to align data received in the message; and if the local port is configured to transfer data on the plurality of sub-links: aggregating the plurality of sub-links of the port to transfer data on a link having the first data transfer rate if it is determined, by the network device, that the local PCS receiver detected a code violation error in the message on at least one of the plurality of sub-links. In an implementation of the method, the first data transfer rate is a full data transfer rate capacity of the port. In another implementation of the method, the partitioning further comprises each sub-link having an equal portion of the first data transfer rate.

In yet another implementation of the method, the determining that the local PCS receiver failed to align the data received in the first message comprises receiving, by the local PCS receiver, a plurality of PCS lanes in the message; and determining that the local PCS receiver failed to align the data on each of the plurality of PCS lanes in the first message. In this implementation, the network device can periodically, during a period of time, determine whether the local PCS receiver aligned data received in the first message; and the port is partitioned only if the determination that the local PCS receiver failed to align the data is made at a point in time subsequent to the period of time. This implementation may further include each of the one or more 10GBASE-R PCS links, the 40GBASE-R PCS link, and the 100GBASE-R PCS link are physical layer devices complying with the Institute of Electrical and Electronics Engineers (IEEE) 802.3-2012 standard.

In still other implementations of the method, the local PCS receiver detecting the code violation error in the second message comprises receiving, by the local PCS receiver, the message comprising a lane alignment marker block on the at least one of the plurality of sub-links; and generating the code violation error based on the lane alignment marker block failing to comply with a PCS protocol associated with the at least one of the plurality of sub-links. This implementation may further comprise periodically, during a period of time, determining whether the local PCS receiver detected the code violation error in the second message; and wherein the plurality of sub-links of the port are aggregated only if the determination that the local PCS receiver detected the code violation error is made at a point in time subsequent to the period of time.

In other implementations of the method, the PCS transmitter comprises at least one of: one or more 10GBASE-R PCS links, a 40GBASE-R PCS link, or a 100GBASE-R PCS link. In an implementation, the PCS receiver comprises a 40GBASE-R PCS link and the plurality of sub-links comprise four 10GBASE-R PCS links. In another implementation, the PCS receiver comprises a 100GBASE-R PCS link and the plurality of sub-links comprise ten 10GBASE-R PCS links.

In another example, a network device comprises a local port; at least one memory element; at least one processor coupled to the at least one memory element and the local port; and a port configuration module that when executed by the at least one processor is configured to receive, via the local port, a message from a physical coding sublayer (PCS) transmitter on a remote partner device; determine, by the network device, a configuration of the local port; if the local port is configured to transfer data on a single link having a first data transfer rate: partition the port to transfer data on a plurality of sub-links each having a second data transfer rate if it is determined that a local PCS receiver failed to align data received in the message; and if the local port is configured to transfer data on the plurality of sub-links: aggregate the plurality of sub-links of the port to transfer data on a link having the first data transfer rate if it is determined that the local PCS receiver detected a code violation error in the message on at least one of the plurality of sub-links. In an implementation of the network device, the first data transfer rate is a full data transfer rate capacity of the port. In another implementation of the network device, the partitioning further comprises each sub-link having an equal portion of the first data transfer rate.

In yet another implementation of the network device, the determining that the local PCS receiver failed to align the data received in the first message comprises receiving, by the local PCS receiver, a plurality of PCS lanes in the message; and determining that the local PCS receiver failed to align the data on each of the plurality of PCS lanes in the first message. In this implementation, the network device can periodically, during a period of time, determine whether the local PCS receiver aligned data received in the first message; and the port is partitioned only if the determination that the local PCS receiver failed to align the data is made at a point in time subsequent to the period of time. This implementation may further include each of the one or more 10GBASE-R PCS links, the 40GBASE-R PCS link, and the 100GBASE-R PCS link are physical layer devices complying with the Institute of Electrical and Electronics Engineers (IEEE) 802.3-2012 standard.

In still other implementations of the network device, the local PCS receiver detecting the code violation error in the second message comprises receiving, by the local PCS receiver, the message comprising a lane alignment marker block on the at least one of the plurality of sub-links; and generating the code violation error based on the lane alignment marker block failing to comply with a PCS protocol associated with the at least one of the plurality of sub-links. This implementation may further comprise periodically, during a period of time, determining whether the local PCS receiver detected the code violation error in the second message; and wherein the plurality of sub-links of the port are aggregated only if the determination that the local PCS receiver detected the code violation error is made at a point in time subsequent to the period of time.

In other implementations of the network device, the PCS transmitter comprises at least one of: one or more 10GBASE-R PCS links, a 40GBASE-R PCS link, or a 100GBASE-R PCS link. In an implementation, the PCS receiver comprises a 40GBASE-R PCS link and the plurality of sub-links comprise four 10GBASE-R PCS links. In another implementation of the network device, the PCS receiver comprises a 100GBASE-R PCS link and the plurality of sub-links comprise ten 10GBASE-R PCS links.

In still another implementation, a computer-readable non-transitory medium comprising one or more instructions, for communicating between a network device and a remote partner device, that when executed on a processor configure the processor to perform one or more operations comprises receiving, by the network device via a local port, a message from a physical coding sublayer (PCS) transmitter on the remote partner device; determining, by the network device, a configuration of the local port; if the local port is configured to transfer data on a single link having a first data transfer rate: partitioning the port to transfer data on a plurality of sub-links each having a second data transfer rate if it is determined, by the network device, that a local PCS receiver failed to align data received in the message; and if the local port is configured to transfer data on the plurality of sub-links: aggregating the plurality of sub-links of the port to transfer data on a link having the first data transfer rate if it is determined, by the network device, that the local PCS receiver detected a code violation error in the message on at least one of the plurality of sub-links. In an implementation of the computer-readable non-transitory medium, the first data transfer rate is a full data transfer rate capacity of the port. In another implementation of the computer-readable non-transitory medium, the partitioning further comprises each sub-link having an equal portion of the first data transfer rate.

In yet another implementation of the computer-readable non-transitory medium, the determining that the local PCS receiver failed to align the data received in the first message comprises receiving, by the local PCS receiver, a plurality of PCS lanes in the message; and determining that the local PCS receiver failed to align the data on each of the plurality of PCS lanes in the first message. In this implementation, the network device can periodically, during a period of time, determine whether the local PCS receiver aligned data received in the first message; and the port is partitioned only if the determination that the local PCS receiver failed to align the data is made at a point in time subsequent to the period of time. This implementation may further include each of the one or more 10GBASE-R PCS links, the 40GBASE-R PCS link, and the 100GBASE-R PCS link are physical layer devices complying with the Institute of Electrical and Electronics Engineers (IEEE) 802.3-2012 standard.

In still other implementations of the computer-readable non-transitory medium, the local PCS receiver detecting the code violation error in the second message comprises receiving, by the local PCS receiver, the message comprising a lane alignment marker block on the at least one of the plurality of sub-links; and generating the code violation error based on the lane alignment marker block failing to comply with a PCS protocol associated with the at least one of the plurality of sub-links. This implementation may further comprise periodically, during a period of time, determining whether the local PCS receiver detected the code violation error in the second message; and wherein the plurality of sub-links of the port are aggregated only if the determination that the local PCS receiver detected the code violation error is made at a point in time subsequent to the period of time.

In other implementations of the computer-readable non-transitory medium, the PCS transmitter comprises at least one of: one or more 10GBASE-R PCS links, a 40GBASE-R PCS link, or a 100GBASE-R PCS link. In an implementation, the PCS receiver comprises a 40GBASE-R PCS link and the plurality of sub-links comprise four 10GBASE-R PCS links. In another implementation of the computer-readable non-transitory medium, the PCS receiver comprises a 100GBASE-R PCS link and the plurality of sub-links comprise ten 10GBASE-R PCS links.

EXAMPLE EMBODIMENTS

Data centers are an important aspect of modern network services. A data center may warehouse a vast number of network component hardware including, for example, routers, servers, and switches. Devices may be connected by wires (e.g., cables) or wirelessly. In the case of wired connections, many physical cabling options exist including, e.g., copper, optical fiber, etc. Communication over the connection may utilize any number of communication protocols, each a different layer of the Open Systems Interconnection (OSI) model (e.g., Layer 1: physical layer, Layer 2: data link layer, Layer 3: network layer, etc.). For Ethernet, a communications standard is provided in the Institute of Electrical and Electronics Engineers' (IEEE) 802.3-2012 Ethernet Standard, referenced herein as "802.3" and "IEEE 802.3".

Any small reduction in the resources required to establish network connections between the hardware in a data center can result in large savings. After connecting two devices (e.g., by cables) both of the devices may be manually configured for communication with one another. In some examples, a (local) network component may be connected to a remote device, which has a fixed setting that cannot be configured. In other examples, the local device may be a child of the remote device, and the remote device may be a parent of the local device. In these cases, the child device may be automatically configured to be compatible with the parent device regardless of whether the parent device explicitly transmits its configuration and/or capabilities.

In a case where only the local device can be configured, an existing challenge is to determine (e.g., to establish, set, or modify) a configuration of the local device to be compatible with the remote device before establishing communication with (i.e., transmitting, receiving, decoding, and/or processing data to/from) the remote device. A further challenge is to determine the configuration of the local device without active participation from the remote device. For example, the remote device may not send a list of its capabilities or actively negotiate a matching configuration with the local device.

A conventional system for configuring a local port changes a number of operational lanes (i.e., virtual PCS lanes that are in operation) encoded in a high speed Ethernet signal by using lane information (i.e., a number of operational lanes) received from a PCS transmission unit. These conventional systems maintain the same high-speed protocol (i.e., 40G/100G protocol) between devices regardless of the number of lanes. These conventional systems merely change the number of lanes and a transmission from one device to match a number of lanes received from another device. These systems fail to maintain an overall data transfer rate while changing the protocol for each of a number of sub-links based on detection a set of conditions, as disclosed in an embodiment of the present specification.

Other conventional systems utilize 802.3 Clause 73 Auto-negotiate or FibreChannel Auto-Negotiate. Clause 73 Auto-negotiate is limited to copper and backplane Ethernets (e.g., media 40GBase-KR4, 40GBase-CR4, and 100GBase-CR10). However, Clause 73 Auto-negotiate is not supported for non-copper and non-backplane medias (e.g., 10GBase-R, 40GBase-SR4, 100GBase-SR10, 40GBase-LR4, 100GBase-LR4, and 100GBase-ER4). The methods and systems disclosed herein provide automatic configuration of ports on any of the above-identified media including, e.g., 40GBase-KR4, 40GBase-CR4, 100GBase-CR10, 10GBase-R, 40GBase-SR4, 100GBase-SR10, 40GBase-LR4, 100GBase-LR4, and 100GBase-ER4.

Figure 1B:
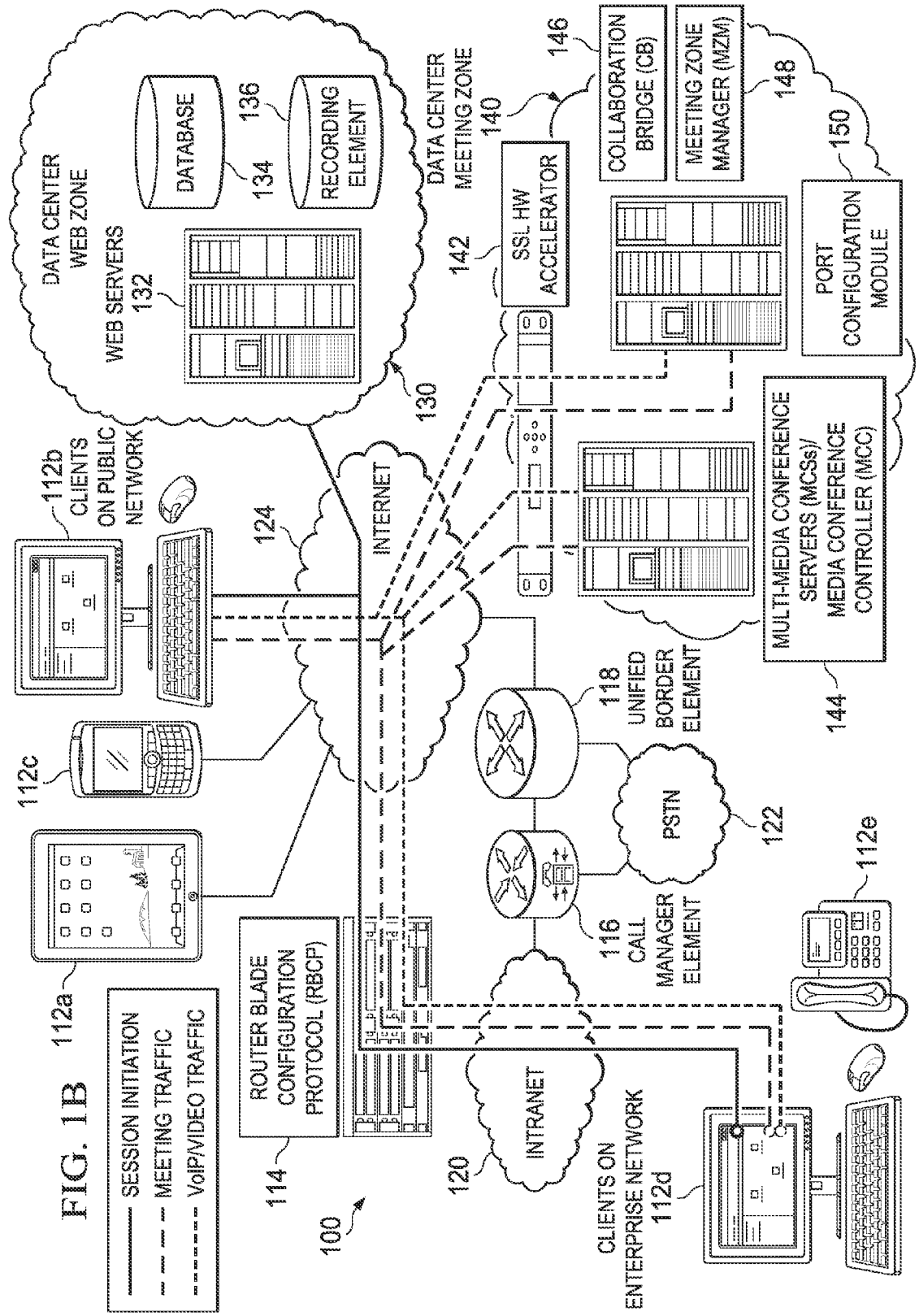

FIGS. 1A and 1B are simplified block diagrams an embodiment of a system according the present specification. Turning now to FIG. 1A, system 70 includes servers 1 through n (i.e., servers 102*a*, 102*b*, and 102*c*), where n may be any number greater than or equal to zero. In this example, servers 102 are connected to a (parent) network switch 106 by network extension hardware 104. The network switch 106, in turn, couples the servers to one or more networks (e.g., internet 124 and/or network 109). Network extension hardware 104 includes interfaces 110 and 112, and port configuration module 111. Interface 110 operatively couples the network extension hardware 104 and the network switch 106. Network extension hardware 104 transmits and/or receives data (e.g., to/from network switch 106) on interface 110. Network switch 106 transmits and/or receives data (e.g., to/from network extension hardware 104) on interface 110. Interface 112 operatively couples the network extension hardware 104 and the servers 102*a-c*. Network extension hardware 104 may transmit and/or receive data (e.g., to/from servers 102*a-c*) on interface 112. Servers 102*a-c* transmit and/or receive data (e.g., to/from network extension hardware 104) on interface 112. Port configuration module 111 is operatively coupled to each of interface 110 and 112. Module 111 may identify and/or modify a configuration of each of interfaces 110 and 112.

In one example, system 70 corresponds to a data center comprising multiple servers, switches, routers, and/or other network components. Network extension hardware 104 may be a device stored in a server rack with servers 102. In this example, network extension hardware 104 extends the reach of the ports (i.e., ports within interface 110) of the network switch 106, effectively acting as a remote line card for network switch 106. System 70 is not limited to this example and may encompass any system where a local device requires configuration to communicate with a remote device (e.g., where the remote device has fixed and unknown configuration).

FIG. 1B illustrates system 100, which is an example implementation of system 70 in a data center. In this example, data center web zone 130 and/or data center meeting zone 140 is an implementation of system 70, wherein web servers 132 or MCS/MCC servers 144, respectively, are in implementation of servers 102*a-c*. In specific implementations, communication system 100 can be provisioned for use in generating, managing, hosting, and/or otherwise providing virtual meetings. In certain scenarios (many of which are detailed below), communication system 100 may configure a port (or links connected thereto) of a first device based on a port (or links connected thereto) of a second device (e.g., a remote device) to which the first device is connected. The architecture of communication system 100 is applicable to any type of conferencing or meeting technology such as video conferencing architectures (e.g., Telepresence™), web cam configurations, smartphone deployments, personal computing applications (e.g., Skype™), multimedia meeting platforms (e.g., MeetingPlace™, WebEx™, etc.), desktop applications, or any other suitable environment in which video data is sought to be managed.

Communication system 100 may include any number of endpoints 112*a-e* that can achieve suitable network connectivity via various points of attachment. In this particular example, communication system 100 can include an Intranet 120, a public switched telephone network (PSTN) 122, and an Internet 124, which (in this particular example) offers a pathway to a data center web zone 130 and a data center meeting zone 140.

Data center web zone 130 includes a plurality of web servers 132, a database 134, and a recording element 136. Data center meeting zone 140 includes a secure sockets layer hardware (SSL HW) accelerator 142, a plurality of multimedia conference servers (MCSs)/media conference controller (MCC) 144, a collaboration bridge 146, a meeting zone manager 148, and a port configuration module 150. As a general proposition, each MCS can be configured to implement a port configuration module for modifying a configuration of a port. Additionally, each MCC can be configured to manage the MCS from data center meeting zone 140. Note that various types of routers and switches can be used to facilitate communications amongst any of the elements of FIG. 1B.

Throughout the present disclosure, reference is made to configuring a local port for 10G mode or 40G mode. However, those of skill in the art will appreciate that the teachings of the present disclosure equally apply to other configurations. For example, the teachings may apply to configuring a port between a 10G mode and a 100G mode, between a 25G mode and a 100G mode, or between any low transmission mode to a higher transmission mode where the encodings at each mode are incompatible. In addition, the port configuration operations described herein may be applied to any endpoint (e.g., endpoints 112a-e), network element (e.g., network elements 116, 118, 132, 134, 136, and/or 144), or node.

Figure 2A:
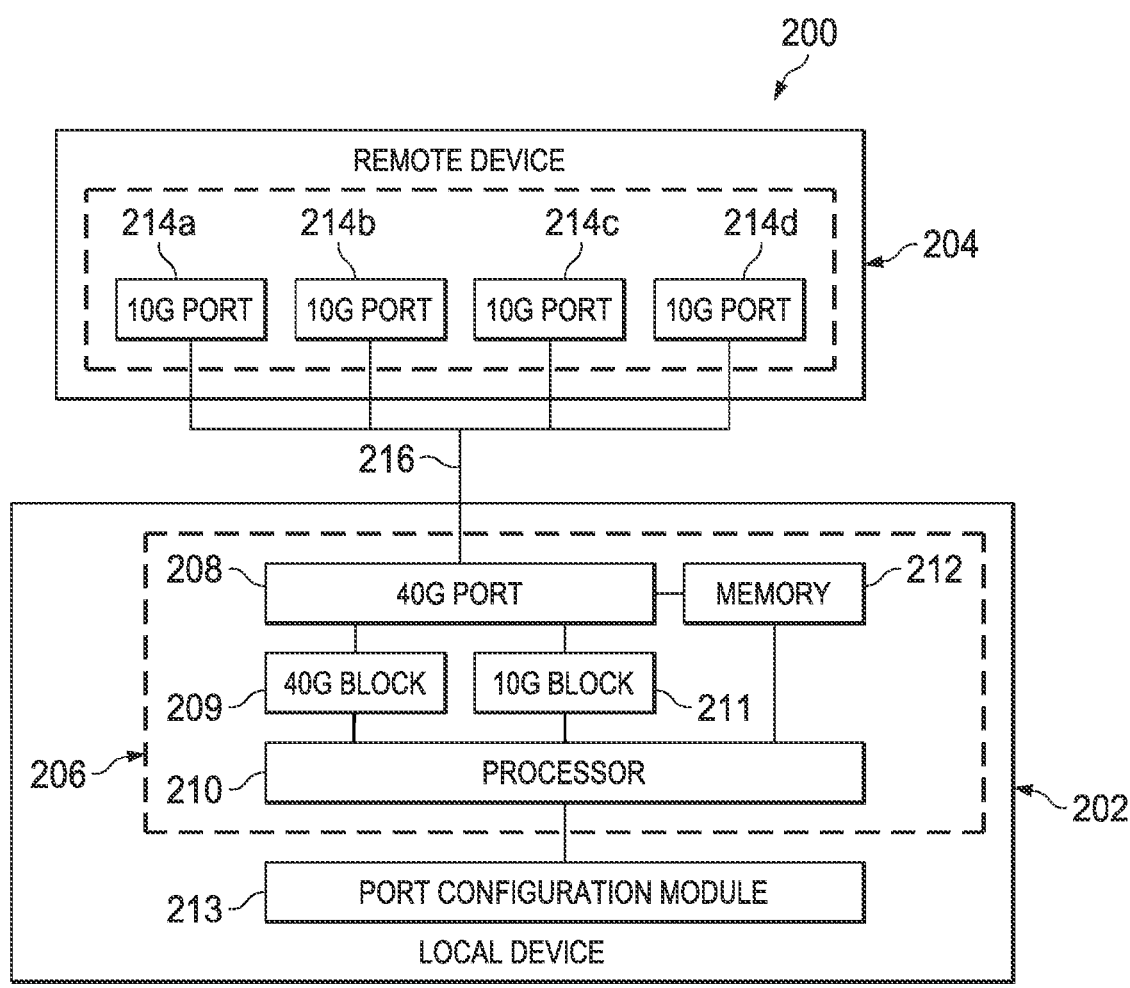
FIGS. 2A, 2B, and 2C illustrate a schematic diagram of a system for communication between one or more network elements according to an embodiment of the present disclosure.
Figure 2B:
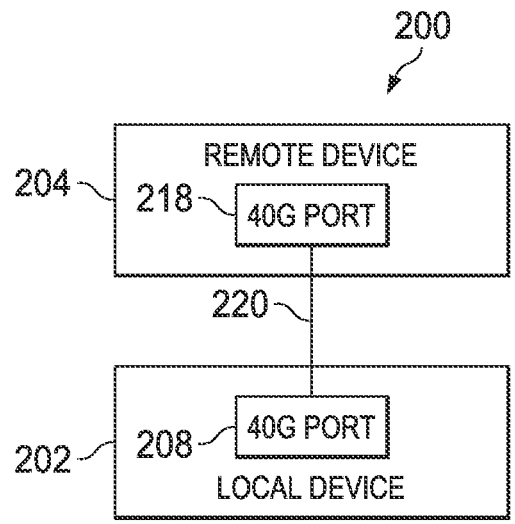
Figure 2C:
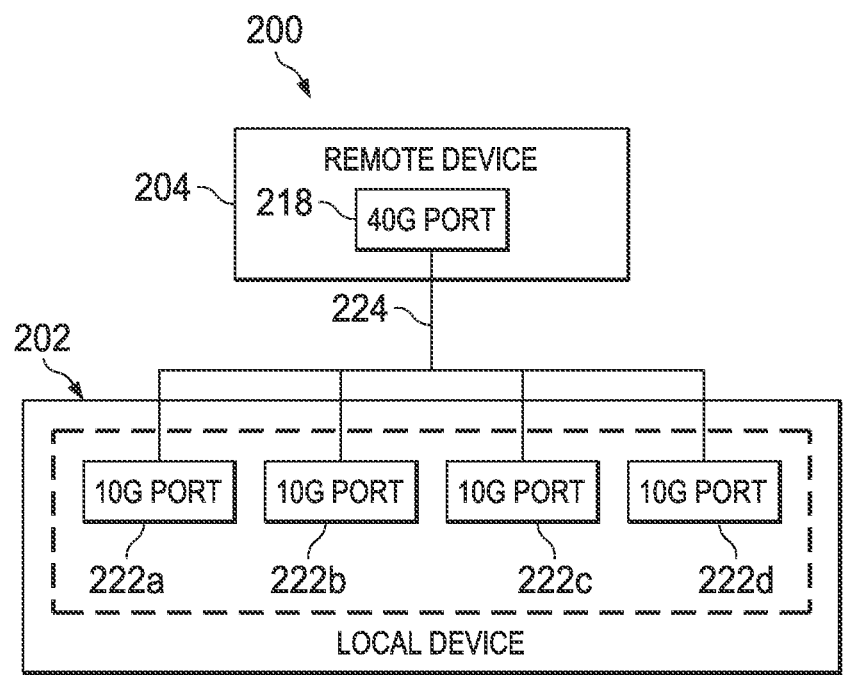

FIGS. 2A, 2B, and 2C illustrate schematic diagrams of one or more systems for communication between network elements according to an embodiment of the present disclosure. Turning to FIG. 2A, FIG. 2A illustrates a local device 202 coupled to a remote device 204 by link 216. Remote device 204 includes four 10 Gigabit per second (10G) ports (ports 214a, 214b, 214c, and 214d), each coupled to a corresponding 10G physical element (e.g., PHY layer of the OSI model) including a media access control (MAC) layer and 10G physical coding sublayer (PCS) layer. Each of the remote 10G PCSs includes a 10G PCS receiver and a 10G PCS transmitter, per IEEE 802.3. Local device 202 includes a port configuration manager 213 coupled to local interface 206. Local interface 206 includes a 40G Gigabit per second (40G) port 208, memory 212, processor 210, a 40G hardware block 209, and 10G hardware block 211. The 40G hardware block 209 contains a MAC layer and 40G PCS layer. The 40G PCS includes a 40G PCS receiver and a 40G PCS transmitter, per IEEE 802.3. The 10G hardware block 211 contains four 10G physical elements; each physical element includes a MAC layer and a 10G PCS layer. Each of the local 10G PCSs includes a 10G PCS receiver and a 10G PCS transmitter, per IEEE 802.3. Each of the 40G port 208, the memory 212, and the processor 210 are operatively coupled to one another. Processor 210 may access (e.g., transmit, receive, delay, modify, delete, etc.) data on the port 208 (e.g., via block 209 or via block 211) and/or data on the memory 212. One end of link 216 is coupled to the 40G port 208 on the interface 206 of the local device 202. Another end of the link 216 includes four links each of which is coupled to one of four 10G ports (i.e., ports 214a, 214b, 214c, and 214d) on the remote device 204.

In an embodiment, local device 202 may include one or more interfaces similar to (or exactly like) interface 206. The one or more interfaces may each contain a port, a memory, and a processor and/or may share common a port, memory, and/or processor. For example, interface 110 may include a plurality of interfaces similar to interface 206.

In operation, before a local device can establish communication with a remote device over a link, the local device must configure a local port with settings that are compatible with a port on the remote device. If the local port is not compatible with the remote port, then data received on the local port from the remote may be misinterpreted (e.g., causing errors or failing to align data). If the local port is compatible with the remote port, then data received on the local port from the remote may be correctly interpreted (e.g., causing no errors and/or successfully aligning data).

The local port may be configured to operate using one of plurality hardware blocks for receiving and/or transmitting data. For example, one configuration of the local port 208 (e.g., as determined by port configuration module 213) is to transmit and/or received data using the 40G block 209. When using the 40G block 209, a 40G PCS at the local device 202 encodes and/or decodes data using the 40G Gigabit per second high-speed Ethernet PCS standard (i.e., IEEE 802.3 Clause 82, "40GBASE-R PCS" or "100GBASE-R PCS"), which includes lane alignment marker blocks to delimit a plurality of virtual PCS lanes in a transmission signal. Another configuration of the local port 208 (e.g., as determined by port configuration module 213) is to transmit and/or receive data using the 10G block 211. When using the 10G block 211, each of the four 10G PCSs at the local device 202 encodes and/or decodes data using 10GBASE-R PCS encoding, which does not include lane alignment marker blocks. In the example of FIG. 2A, port configuration manager 213 selectively activates a 40G mode of operation (i.e., using 40G block 209 and a 40G PCS) or a 10G mode of operation (i.e., using 10G block 211 and at least one 10G PCS) based on conditions detected by an active PCS at the local device 202. In end example, only one mode is active at a time; thus, when one mode is active all other modes are not active. In some cases, setting a port in a mode of operation may also require partitioning a port or aggregating ports (or sub-ports).

Configuring a port (e.g., local port 208) may comprise partitioning a port into one or more sub-ports (e.g., for transferring data on one or more links). For example, a port may be a 40G Quad Small Form-factor Pluggable (QSFP or QSFP+) port. A QSFP port includes 38 pins including four pairs of transmitter pins and four pairs of receiver pins. In one example, the pairs of transmitter pins and receiver pins of a single 40G port may be divided to correspond to four physical ports or links (i.e., four 10G ports). For example, a QSFP port may be physically partitioned into four physical sub-ports, where each physical sub-port may include one pair of transmitter pins and one pair of receiver pins on the QSFP port. In another example, the port may be partitioned virtually into a number of sub-ports. In a virtual partition, the 40G QSFP port may be mapped to a specific encoding on a number of virtual channels of the port using, e.g., multiplexing. The partitioned ports (whether virtual or physical) may be coupled to a hardware block(s) (e.g., each of the physical elements of 10G block 211) that corresponds to type of ports (e.g., based on data encoding). Likewise, the when all partitions of the port are aggregated into a single port (e.g., all transmitter pins and all receiver pins on the port used as single port), the port may be coupled to a hardware block (e.g., 40G block 209) that corresponds to the type of port (e.g., based on data encoding).

In FIG. 2A, the four 10G PCSs at the remote device 204 encode data using a 10 Gigabit per second Ethernet standard (i.e., IEEE 802.3 clause 49, "10GBASE-R PCS") for transmission over port 216. Thus, data received by the port 208 on the local device 202 (from remote device 204) is a parallel receipt of data from four 10G ports (and four corresponding 10G PCSs), each using 10 GbE encoding. In this case, if the local port 208 is in the 40G mode, the local device 202 will misinterpret data received from remote ports 214 due, in part, to the data being encoded in the 10 GbE protocol and not encoded in the 40G GbE protocol (i.e., clause 82 encoding). For example, an error may be generated (at local device 202) due to the data (sent from the remote device 204) not including lane alignment marker blocks. Upon detecting an error (e.g., failure to align lanes)

while in 40G mode, the port configuration manager 213 may modify the configuration of the local port by switching the local port from 40G mode to 10G mode. When activated, the 10G mode maintains the overall data transfer rate of the local port 208 (40G data transfer rate) and divides the data transfer rate across several channels (i.e., four 10G channels) with a new encoding protocol. In an embodiment, port configuration manager 213 may modify the configuration of a local port by, e.g., setting one or more bits to in a memory (e.g., "0" for 10G mode or "1" for 40G mode in a hardware register), opening or closing a gate to physically connect/disconnect the local port to a hardware block (e.g., hardware blocks 209 and 211), and/or any other approach to selectively activating a mode of the local port.

In an embodiment, the systems and methods described herein automatically configure a local port for communication with a remote device when a configuration of a remote port at the remote device is fixed (and/or cannot be configured by the local device). For example, configuring the local port may include automatically dividing the data transfer rate across several physical or logical channels. The data transfer rate of the local port 208 on the local device 202 may be divided into a number of (in this case 4) physical or logical channels for communication with port 218 on the remote device 204, which may have a fixed configuration. Conventional approaches to configuring a device (e.g., Clause 73 auto-negotiating) require both devices (e.g., a local device and a remote device) to be active participants in automatic detection of a protocol (e.g., each device explicitly signaling protocol capabilities to the other device). An embodiment of the present disclosure advantageously only requires one device (e.g., the local device) to participate in automatically configuring a port based on detecting content of data received at the device from the other device (e.g., from the remote device).

Turning to FIG. 2B, FIG. 2B illustrates a local device 202 coupled to a remote device 204 by link 220. The components in FIG. 2B are similar to the components in FIG. 2A. In FIG. 2B, device 202 includes port configuration manager 213, processor 210, 10G block 211, 40G block 209, and memory 212; however, these elements are not illustrated only to simplify the drawing for clarity. A difference between FIGS. 2A and 2B is that in FIG. 2B the remote device 204 includes a 40G port instead of one or more 10G ports. Another difference is that link 216 (FIG. 2A) is a 40G to 4×10G link, while link 220 (FIG. 2B) is a 40G to 40G link.

A number of error conditions may or may not arise based on the configuration of the local port and the configuration of the remote port. In one implementation of FIG. 2B, remote 40G port 218 transmits data on a single 40G port using 40G GbE protocol. In this example, an error may occur if the local port 208 is not configured for 40G GbE protocol. For example, if the local port is configured for four 10 GbE sub-ports (e.g., in 10G mode and not in 40G mode and/or whether physical or virtualized ports) over the port (e.g., a QSFP port), the transmission of data in 40G GbE protocol from the remote device may cause the local device to generate an error (e.g., a code violation error based on the unexpected presence of lane alignment marker blocks). However, if the local port is configured to receive data on a single port using 40G GbE protocol (e.g., using a 40G mode and not a 10G mode), then the transmission of data in 40G GbE protocol from the remote device will cause no errors and the two devices can establish two-way communication.

In another implementation of FIG. 2B, remote 40G port 218 transmits data on a four virtual 10G sub-ports using 10 GbE protocol (e.g., by multiplexing the 4 signals over the 40G port onto the link). In this example, an error may occur if the local port 208 is not configured for 10 GbE protocol. For example, if the local port is configured to receive data on a single port using 40G GbE protocol (e.g., using a 40G mode and not a 10G mode), the transmission of data in 10 GbE protocol from the remote device may cause the local device to generate an error (e.g., failure to align the data based on the absence of lane alignment marker blocks). However, if the local port is configured for four 10 GbE sub-ports over the port (e.g., in a 10G mode and not in a 40G mode), the transmission of data in 10 GbE protocol from the remote device will cause no errors and the two devices can establish two-way communication.

FIG. 2C shows the remote device 204 having a 40G port and the local device 202 having 4 individual 10G ports 222a-d . In FIG. 2C, device 202 includes port configuration module 213, processor 210, 10G block 211, 40G block 209, and memory 212 coupled in a manner similar to FIG. 2A; however, these elements are not illustrated only to simplify the drawing for clarity. 10G ports 222a -d in device 202 are four individual 10G ports (e.g., 4 SFP+ports) each configured for transmitting and receiving data in 10GbE protocol. Each of the ports 222a -d is coupled to 40G block 209 and each is coupled to 10G block 211 (e.g., each is coupled to a corresponding one of the physical elements of the 10G block).

Thus, if the data received by the local device from the remote device is encoded in the IEEE 40G GbE protocol, then one or more of the local 10G port will receive a lane alignment marker block (i.e., based on the IEEE 802.3 40G/100G Ethernet specification). Since the IEEE 10 GbE standard does not define a lane alignment marker block, the presence of the lane alignment marker block is detected as a code violation error (e.g., by a 10G PCS receiver). Although 40G GbE contains 4 virtual PCS lanes, the PCS lanes may not necessarily correspond to the physical links connected to the 10G ports in the local device 202. Thus, a 10G PCS receiver (e.g., 10GBASE-R PCS receiver) on the local device (e.g., one for each port) detects an error (e.g., a code violation error) upon receiving a lane alignment marker block. In this example, detecting a code violation error (while in 10 GbE mode) is an indication that the remote device is operating in the 40G GbE standard. After detecting the code violation error, the local device may configure the port for received data using the 40G GbE standard (e.g., activating 40G mode). For example, a processor may virtualize a 40G port based on the inputs from the four 10G ports 222. Therefore, though the data are received on four individual 10G ports 222, the virtual 40G port may communicate with the remote device using the 40G GbE standard. In another implementation, the local device does not provide a virtualized 40G port. Instead, the parent device provides a logical partition of its 40G port into 4 serial 10G ports. In this case, the parent device transmits data from the 4 virtual ports to the physical 10G ports (222a-d) on the local device.

In an embodiment, the local device is a child device (e.g., a slave) and must configure its local port to match (or be compatible with) a port on a parent device. In an embodiment, a processor and/or port configuration manager on the local device may generate a configuration for the local port. In another embodiment, local device 202 is a network extension device (e.g., device 104, FIG. 1A) and remote device is a network switch (e.g., network switch 106, FIG. 1A).

Figure 3:
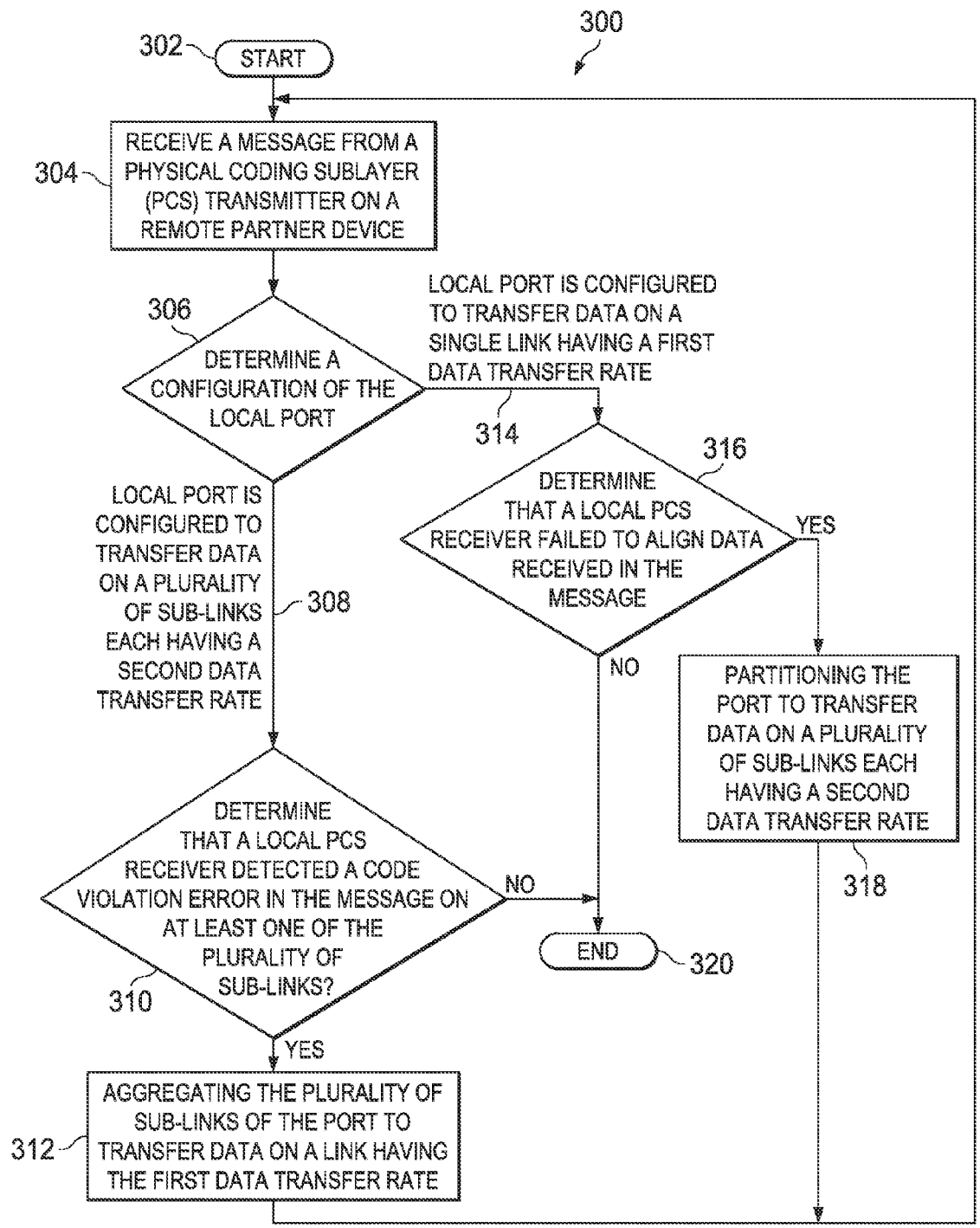
FIG. 3 is a diagram of exemplary logic for communicating between a local device and a remote device according to an embodiment of the present disclosure.

FIG. 3 is a diagram of exemplary logic (Logic 300) for communicating between a local device and a remote device according to an embodiment of the present disclosure. Logic 300 begins as 302 and advances to 304. At 304, a message is received (e.g., by a local port on a network component) from a physical coding sublayer (PCS) transmitter on a remote partner device. The message may be received on the local port of the local device. Upon received the message, at 306, a determination is made of a configuration of the local port. The configuration may be for transferring data over a single port or over a plurality of sub-ports (e.g., connected to a plurality of links or sub-links). In an embodiment, the plurality of sub-ports may be equal portions of a full data transfer rate of the local port.

At 308, if the local port is determined (e.g., by a processor on a local device) to have a configuration for transferring data on a plurality of sub-ports each of the sub-ports having a second data transfer rate, the algorithm advance to 310. For example, the plurality of sub-ports may be a set of physically individual ports (e.g., four separate 10G ports). In another example, the plurality of sub-ports may be virtual subdivisions of a single physical port (e.g., a single 40G QSFP or QSPF+ port that is virtually divided in four individual 10G port). At 310, it is determined whether a local PCS detected a code violation error in the message on at least one of the plurality of sub-ports (e.g., in data received via the local port on the network device). Requiring absence of code violation errors on only one of the sub-ports advantageously enables the logic to correctly configure the local court even when a link is connected only to one of the sub-ports.

According to the present disclosure, a code violation error is an indication that a high speed encoding (e.g., 40G/100G protocol) is being sent on a link (via a port) at a slower speed. The code violation errors (e.g., detected by a 10GBASE-R PCS) may be due to the presence of lane alignment marker blocks, which are defined in the 40G GbE/100 GbE protocol and are not included according to the 10 GbE protocol. In this case, the 10GBASE-R PCS recognizes the lane alignment marker blocks code violation errors. In one example, upon receiving a signal containing a lane alignment marker block (from a remote port/PCS), the 10GBASE-R PCS receiver generates a code violation error. The local network device may detect the code violation error generated by the local PCS (i.e., the 10GBASE-R PCS).

If the local PCS receiver detects (at 310) a code violation error on one of the sub-ports, the algorithm advances to 312. At 312, a plurality of sub-ports (e.g., connected to a link(s)) of the port is aggregated into a single port for transporting data at a first data transfer rate. Any code violation error indicates that that a lower speed port (and a corresponding PCS) has received transmission from a higher speed port (and a corresponding PCS). Thus, if the local port is at a low speed, it is in indication that the current (low) speed should be increased to a higher speed. In one example, a current speed may be 10G (e.g., in a 10G mode) and may be increase to 40G (e.g., by activating a 40G mode). In another example, a current speed may be 10G and may be increase to 100G40G (e.g., by activating a 100G mode). After the sub-ports are aggregated into a single port, the algorithm returns to 304. This creates a loop, such that after the conditions for aggregating the plurality of sub-port into a single port have been met, the algorithm continues to receive data from the remote partner to test whether the new port configuration results in successfully receiving the data in an expected format. If the local PCS receiver does not detect (at 310) a code violation error on one of the sub-ports, the algorithm advances to 320.

If it is determined (at 306) that the local port is configured to transfer data by a single port (on a single link) having a first data transfer rate (314), the algorithm advances to 316.

At 316, a determination is made as to whether (e.g., a processor determines whether) a local PCS receiver failed to align data received in the message. The data in the message may be a stream of data captured over the local port over a period of time. In an embodiment, the data is stored on a memory (e.g., a random access memory) for inspection by the network component. In one example, at 316, a determination is made as to whether (e.g., a processor determines whether) the local PCS receiver successfully aligned (as opposed to failed to align) data received in the message. At 316, if the local PCS to failed to align (did not succeed), then the algorithm advances to 318. At 381, the port is partitioned to transfer data on a plurality of sub ports (connected to links or sub-links) each having a second data transfer rate. Any failure to align data in the received data stream indicates that that a high speed port (and a corresponding PCS) has received transmission from a lower speed port (and a corresponding PCS). Thus, if the local port is at a high speed, it is in indication that the current (high) speed should be decreased to a lower speed. In one example, a current speed may be 40G (e.g., in a 40G mode) and may be decreased to 4×10G (e.g., by activating a 10G mode). In another example, a current speed may be 100G and may be decreased to 4×10G (e.g., by activating a 10G mode). After the sub-ports are partitioned into sub-ports, the algorithm returns to 304. If it determined that the local PCS did not fail to align the message (i.e., successfully aligned the data in the message), then the algorithm advances to 320.

In one aspect, methods and systems of the present disclosure leverage a known data transfer capacity of the local port to selectively generate various IEEE PCS encoding protocols (e.g., 10GBASE-R PCS and 40/100GBASE-R PCS) and/or divisions of the transfer capacity based on detecting various error conditions and without active cooperation from a remote partner. In an embodiment, the combination of protocol and divisions of the transfer capacity are specified such that the sum of the data transfer rate of the divisions is equal to a maximum data transfer rate of the port. For example, if the maximum transfer rate of the port is 100G, then the port may be partitioned into ten individual 10G physical ports (e.g., sub-ports) for communication with a link partner (e.g., using separate pins on a 100G host that correspond to each of the ports and/or a 10G mode). In another embodiment, the divisions of the port may be virtual divisions of the capacity of the port. In addition, individual physical ports may be virtually aggregated into a single virtual port (and or link) for connection with a link partner (e.g., a remote device).

Figure 4:
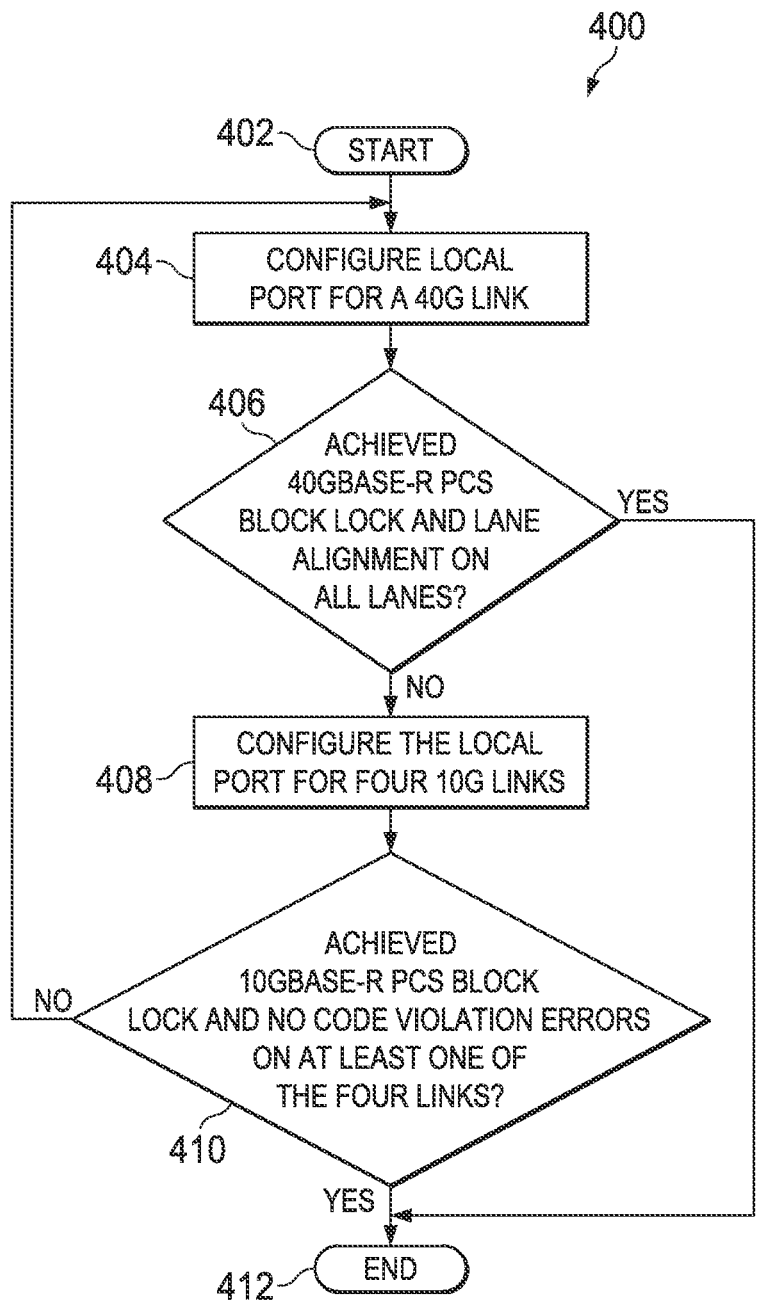
FIG. 4 is a diagram of exemplary logic for communicating between a local device and a remote device according to an embodiment of the present disclosure.

FIG. 4 is a diagram of exemplary logic (Logic 400) for communicating between a local device and a remote device according to an embodiment of the present disclosure. Logic 400 begins at start point 402. Following 402, the logic configures a local 40G Ethernet port link for transferring data over a single 40G port (e.g., connected to a single link) at 404. This configuration sets the port for transmitting and/or received data on a single port (via a single link) from a remote port (e.g., on a remote link partner, parent network switch, etc.), wherein the single port is set to a full data transfer rate capacity of the port (in this case, 40G). After configuring the local port, the logic advances to 406, where it is determined whether a local PCS received achieved 40GBASE-R PCS block lock and lane alignment on all PCS lanes of data received over the local port (e.g., received from a PCS transmitter on a remote device). Block lock may be determined by whether the PCS receiver detects the blocks in the 64B/66B encoding. In one example, block lock (i.e., Block synchronization per IEEE 802.3 Clause 49) is achieved when the PCS receiver successfully detects a header(s) within the received data blocks and can identify the blocks based on the location of the headers. For example, in 64B/66B encoding, each block is 66 bits long and the first two bits of the block are a header. In this example, the PCS receiver achieves block lock by identifying the headers and accessing (e.g., identifying and/or outputting) the 66-bit blocks based on the location of the header (i.e., accessing the 66-bit block including the corresponding header). Lane alignment may be determined based on detecting one or more lane alignment marker blocks in each of a plurality of PCS lanes. After a PCS receiver detects lane alignment marker blocks, virtual PCS lanes in a received signal may be shifted (or de-skewed) with respect to one another to align the lane alignment marker blocks in each lane. In one example, a PCS lane is aligned if the lane alignment marker block in one lane is successfully aligned (e.g., by a PCS receiver) to the lane alignment marker blocks in another lane (e.g., for a predetermined number of consecutively received lane alignment marker blocks in each lane).

If it is determined (e.g., at 406) that 40GBASE-R PCS block lock and lane alignment have been achieved (i.e., "Yes" in FIG. 4) on all PCS lanes of the data received from the remote port, the algorithm advances to 412, where it may terminate (or advance to other logic). According to the present disclosure, successfully achieving block lock and alignment on all PCS lanes—while the local port is configured for data transmission on a single link at a full data transfer rate capacity of the port—indicates that the configuration of the local port matches a configuration of the remote port (in this case, both the local port and the remote port are configured for 40G transmission on a single 40G link).

If it is determined (e.g., at 406) that 40GBASE-R PCS block lock and lane alignment have not been achieved (i.e., failing to achieve, "No" in FIG. 4) on all PCS lanes of the data received from the remote port, logic 400 proceeds to 408. In an embodiment, the local port is a 40G QSFP including (or accessing) a local 40GBASE-R PCS receiver and the remote port is one or more SPF ports including (or accessing) a corresponding one or more 10GBASE-R PCS transmitters. In such an embodiment, the local 40GBASE-R PCS receiver will not achieve lane alignment due to an absence of 40GBASE-R PCS lane alignment marker blocks in a signal generated by the one or more remote 10GBASE-R PCS transmitters. According to the present disclosure, failing to achieve 40GBASE-R PCS block lock and lane alignment on all PCS lanes indicates that the configuration of the remote port is configure transmission on four independent 10G links.

In an embodiment, 406 is only executed after an amount of time has elapsed (e.g., a waiting period, or delay) following the completion of 404. In another embodiment, 406 is periodically executed during a period of time, which begins at a point at which 404 is complete and ends after amount of time. In the latter embodiment, during the time period, the algorithm may continue to execute 406 as long as the determination is negative (i.e. "No" in FIG. 4). However, if the determination is positive (i.e., yes in FIG. 4) at any point during the time period, then the algorithm may advance to 412. In some embodiments, logic 400 may cause a processor to store an indication (e.g., in memory) that the determination was positive and then wait until the time to complete for dancing to 412. In other embodiments logic 400 may end the waiting period at the point at which the determination. In one example, the wafting period may be about 2 seconds.

At 408, logic 400 configures the local 40G Ethernet port for transferring data over four independent 10G ports (e.g., 4×10G) and then advances to 410. While the new configuration may not alter the overall data transfer rate of the port (i.e., the overall transfer rate remains 40G as it was at 404), it may change the manner in which the port transfers data (e.g., sends and/or receives data from a remote link partner over a number of links connected to the port).

At 410, logic 400 determines whether 10GBASE-R PCS block lock have been achieved on at least one of the four links, and determines whether any code violation errors are detected on the at least one the four ports. According to the present disclosure, achieving 10GBASE-R PCS block lock and no code violation errors on at least one of the PCS lanes indicates that the configuration of the local port matches the configuration of the remote port. In this case, the local port is configured for 40G transmission on four independent 10G ports. If it is determined that 10GBASE-R PCS block lock has been achieved and that there are no code violation errors (i.e., a same of the at least one of the four links must meet both conditions) (i.e., "Yes" in FIG. 4), logic 400 advances to 412. However, the local PCS failing to achieve 10GBASE-R PCS block lock and detects a code violation error on at least one lane indicates that the remote port is configured as a single 40g port. Therefore, upon determining that 10GBASE-R PCS block lock not been achieved or that there is a code violation error on at least one of the links (i.e., "No" in FIG. 4), logic 400 returns to 404. In addition, requiring PCS block and the absence of code violation errors on only one of the ports enables the logic to correctly configure the local court even when link 216 is connected only to one of the four 10G ports.

Figure 5:
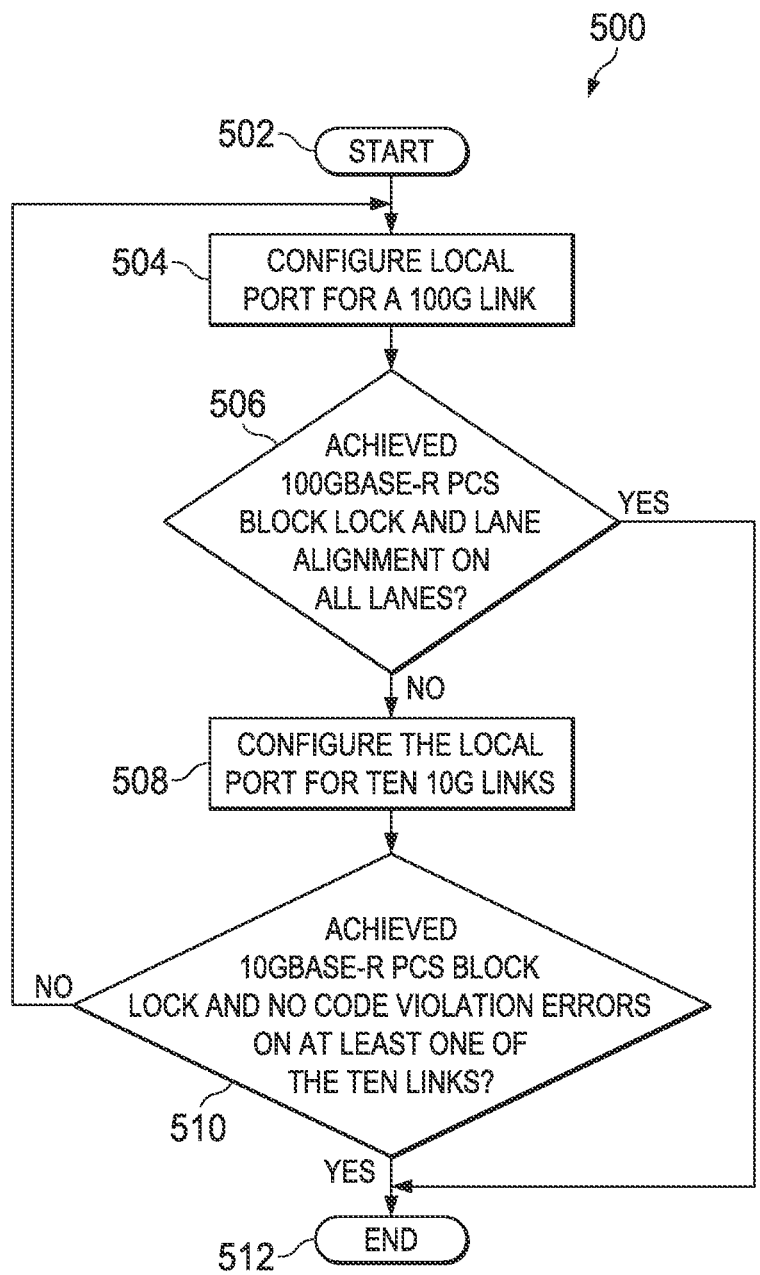
FIG. 5 is a diagram of exemplary logic for communicating between a local device and a remote device according to an embodiment of the present disclosure.

Throughout the present disclosure, reference is made to configuring a local port for 10G mode or 40G mode. However, those of skill in the art will appreciate that the teachings of the present disclosure equally apply to, e.g., configuring a local port for a 10G mode or a 100G mode. For example, FIG. 5 is a diagram of exemplary logic (Logic 500) for communicating between a local device and a remote device according to an embodiment of the present disclosure. Logic 500 is includes procedures that correspond to the procedures of logic 400. The teachings of logic 400 apply to logic 500. A key difference between logic 400 and logic 500 is that execution of logic 400 configures a 40G port while execution of logic 500 configures a 100G port. In logic 500, a 100G port may be divided into ten 10G ports (sub-ports) and/or aggregated from ten 10G ports into a single 100G link.

In an embodiment, one or more of logic 300, logic 400, and logic 500 may be implemented by a network device to configure a local port based on data received from a remote device, thereby allowing the network device to configure itself with no cooperation from the remote device and no user input (i.e., no human intervention) after the devices are connected by one or more links. Logic 300, 400, and/or 500 may be executed by a processor, application-specific integrated circuit (ASIC)), or port configuration module accessible by the network device.

Within the context of the disclosure, a network used herein represents a series of points or nodes of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber-to-the-x (FTTx), which is a generic term for any broadband network architecture that uses optical fiber in last-mile architectures, and data over cable service interface specification (DOCSIS) cable television (CATV). The architecture can also operate in junction with any 3G/4G/LTE cellular wireless and WiFi/WiMAX environments. The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers, end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, network extension hardware, switches, servers, interfaces, and/or ports described herein may include software to achieve (or to foster) the functions discussed herein for enabling communication between and/or configuration of network elements. This could include the implementation of instances of network extension hardware, switches, servers and/or any other suitable element that would foster the activities discussed herein. Additionally, each of these elements can have an internal structure (e.g., a processor, a memory element, etc.) to facilitate some of the operations described herein. In other embodiments, these functions for enabling communication between and/or configuration of network elements may be executed externally to these elements, or included in some other network element to achieve the intended functionality. Alternatively, network extension hardware, switches, servers, interfaces, and/or ports may include software (or reciprocating software) that can coordinate with other network elements in order to achieve the configuration functions described herein. In still other embodiments, one or several devices may include any suitable algorithms, hardware, software, components, modules, interfaces, or objects that facilitate the operations thereof.

In certain example implementations, the device, interface, and/or port configuration functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors (e.g., 210), or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to enable enabling communication between and/or configuration of network elements disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, interfaces, network extension hardware, ports etc.) can include memory elements for storing information to be used in achieving communication between and/or configuration of network elements, as outlined herein. Additionally, each of these devices may include a processor that can execute software or an algorithm to perform the size estimation activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of enabling communication between and/or configuration of network elements, as potentially applied to a myriad of other architectures.

It is also important to note that the steps in the FIGS. 3, 4, and 5 illustrate only some of the possible scenarios that may be executed by, or within, the logic described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the network extension hardware, network components, in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

In one example implementation, any memory may be used for storing information to be accessed in achieving the procedures, as discussed herein. Additionally, network extension hardware, interface, or port may include instances of a processor that can execute software or an algorithm to enable communication between and/or configuration of network elements, as disclosed in this Specification. These devices may further keep information (e.g., variables) in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of network extension hardware, interface, or port can also include suitable interfaces for receiving, transmitting, and/or otherwise communicating data or information in a network environment.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

In one example embodiment, any number of embodiments disclosed herein may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory' or 'memory element'. Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims. The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

Note that all optional features of the apparatus described above may also be implemented with respect to the method or process described herein and specifics in the examples may be used anywhere in one or more embodiments.

In accordance with the well-established principle that an "applicant is entitled to be his or her own lexicographer," MPEP 2111.01(IV), citing In re Paulson, 30 F.3d 1475, 1480 (Fed. Cir. 1994), certain terms have been expressly defined herein. It is expressly intended that those terms have the definitions supplied, and that they not be given any interpretation inconsistent with those definitions.

What is claimed is:

1. A method for communicating between a network device and a remote partner device:
   receiving, by the network device via a local port, a message from a physical coding sublayer (PCS) transmitter on the remote partner device; and
   reconfiguring, by the network device, the local port based on detecting errors associated with the message, wherein a configuration of the remote partner device is fixed, and wherein the reconfiguring comprises:
   determining whether the local port transfers data on a single link or on a plurality of sub-links, wherein:
   partitioning the local port to transfer data on a plurality of sub-links each having a second data transfer rate based on a determination, by the network device, that the local port transfers data on the single link having a first data transfer rate and that a local PCS receiver failed to align data received in the message, and
   aggregating the plurality of sub-links of the local port to transfer data on the single link having the first data transfer rate based on a determination, by the network device, that the local port transfers data on the plurality of sub-links having the second data transfer rate and that the local PCS receiver detected a code violation error in the message on at least one of the plurality of sub-links; and
   maintaining a same overall data transfer rate of the local port regardless of whether the local port transfers data on the single link or on the plurality of sub-links.

2. The method of claim 1, wherein the first data transfer rate is a full data transfer rate capacity of the local port.

3. The method of claim 1, wherein the partitioning further comprises each of the plurality of sub-links having an equal portion of the first data transfer rate.

4. The method of claim 1, wherein the determining that the local PCS receiver failed to align the data received in the message comprises:
   receiving, by the local PCS receiver, a plurality of PCS lanes in the message; and
   determining that the local PCS receiver failed to align the data on each of the plurality of PCS lanes in the message.

5. The method of claim 4, wherein the network device periodically, during a period of time, determines whether the local PCS receiver aligned data received in the message; and
   wherein the local port is partitioned based on the determination that the local PCS receiver failed to align the data being made at a point in time subsequent to the period of time.

6. The method of claim 1, wherein the local PCS receiver detecting the code violation error in the message comprises:

receiving, by the local PCS receiver, the message comprising a lane alignment marker block on the at least one of the plurality of sub-links; and generating the code violation error based on the lane alignment marker block failing to comply with a PCS protocol associated with the at least one of the plurality of sub-links.

7. The method of claim 6, further comprising:

periodically, during a period of time, determining whether the local PCS receiver detected the code violation error in the message; and wherein the plurality of sub-links of the local port are aggregated based on the determination that the local PCS receiver detected the code violation error being made at a point in time subsequent to the period of time.

8. The method of claim 1, wherein the PCS transmitter comprises at least one of: one or more 10GBASE-R PCS links, a 40GBASE-R PCS link, or a 100GBASE-R PCS link.

9. The method of claim 1, wherein the local PCS receiver comprises a 40GBASE-R PCS link and the plurality of sub-links comprise four 10GBASE-R PCS links, or the local PCS receiver comprises a 100GBASE-R PCS link and the plurality of sub-links comprise ten 10GBASE-R PCS links.

10. The method of claim 8, wherein each of the one or more 10GBASE-R PCS links, the 40GBASE-R PCS link, and the 100GBASE-R PCS link are physical layer devices that comply with the Institute of Electrical and Electronics Engineers (IEEE) 802.3-2012 standard.

11. A network device comprising:

a local port;

at least one memory element;

at least one processor coupled to the at least one memory element and the local port; and a port configuration module that when executed by the at least one processor is configured to:

receive, via the local port, a message from a physical coding sublayer (PCS) transmitter on a remote partner device; and reconfigure the local port based on detecting errors associated with the message, wherein a configuration of the remote partner device is fixed, and wherein the reconfiguring comprises:

determining whether the local port transfers data on a single link or on a plurality of sub-links, wherein:

when it is determined that the local port is configured to transfer data on the single link having a first data transfer rate: partition the local port to transfer data on a plurality of sub-links each having a second data transfer rate based on a determination that the local port transfers data on the single link having a first data transfer rate and that a local PCS receiver failed to align data received in the message, and aggregate the plurality of sub-links of the local port to transfer data on the single link having the first data transfer rate based on a determination that the local port transfers data on the plurality of sub-links having the second data transfer rate and that the local PCS receiver detected a code violation error in the message on at least one of the plurality of sub-links; and maintaining a same overall data transfer rate of the local port regardless of whether the local port transfers data on the single link or on the plurality of sub-links.

12. The network device of claim 11, wherein the determining that the local PCS receiver failed to align the data received in the message comprises:

receiving, by the local PCS receiver, a plurality of PCS lanes in the message; and determining that the local PCS receiver failed to align the data on each of the plurality of PCS lanes in the message.

13. The network device of claim 11, wherein the local PCS receiver detecting the code violation error in the message comprises:

receiving, by the local PCS receiver, the message comprising a lane alignment marker block on the at least one of the plurality of sub-links; and generating the code violation error based on the lane alignment marker block failing to comply with a PCS protocol associated with the at least one of the plurality of sub-links.

14. The network device of claim 13, wherein the port configuration module is further configured to:

periodically, during a period of time, determining whether the local PCS receiver detected the code violation error in the message; and wherein the plurality of sub-links of the local port are aggregated based on the determination that the local PCS receiver detected the code violation error being made at a point in time subsequent to the period of time.

15. The network device of claim 11, wherein the local PCS receiver comprises a 40GBASE-R PCS link and the plurality of sub-links comprise four 10GBASE-R PCS links, or the local PCS receiver comprises a 100GBASE-R PCS link and the plurality of sub-links comprise ten 10GBASE-R PCS links.

16. A computer-readable non-transitory medium comprising one or more instructions for communicating between a network device and a remote partner device, wherein the one or more instructions, when executed on a processor, configure the processor to perform one or more operations comprising:

receiving, by the network device via a local port, a message from a physical coding sublayer (PCS) transmitter on the remote partner device; and reconfiguring, by the network device, the local port based on detecting errors associated with the message, wherein a configuration of the remote partner device is fixed, and wherein the reconfiguring comprises:

determining whether the local port transfers data on a single link or on a plurality of sub-links, wherein:

partitioning the local port to transfer data on a plurality of sub-links each having a second data transfer rate based on a determination, by the network device, that the local port transfers data on the single link having a first data transfer rate and that a local PCS receiver failed to align data received in the message, and aggregating the plurality of sub-links of the local port to transfer data on the single link having the first data transfer rate based on a determination, by the network device, that the local port transfers data on the plurality of sub-links having the second data transfer rate and that the local PCS receiver detected a code violation error in the message on at least one of the plurality of sub-links; and maintaining a same overall data transfer rate of the local port regardless of whether the local port transfers data on the single link or on the plurality of sub-links.

17. The computer-readable non-transitory medium of claim 16, wherein the determining that the local PCS receiver failed to align the data received in the message comprises:

receiving, by the local PCS receiver, a plurality of PCS lanes in the message; and determining that the local PCS receiver failed to align the data on each of the plurality of PCS lanes in the message.

18. The computer-readable non-transitory medium of claim 16, wherein the local PCS receiver detecting the code violation error in the message comprises:

receiving, by the local PCS receiver, the message comprising a lane alignment marker block on the at least one of the plurality of sub-links; and generating the code violation error based on the lane alignment marker block failing to comply with a PCS protocol associated with the at least one of the plurality of sub-links.

19. The computer-readable non-transitory medium of claim 18, wherein the one or more operations further comprise:

periodically, during a period of time, determining whether the local PCS receiver detected the code violation error in the message; and wherein the plurality of sub-links of the local port are aggregated based on the determination that the local PCS receiver detected the code violation error being made at a point in time subsequent to the period of time.

20. The computer-readable non-transitory medium of claim 16, wherein the local PCS receiver comprises a 40GBASE-R PCS link and the plurality of sub-links comprise four 10GBASE-R PCS links, or the local PCS receiver comprises a 100GBASE-R PCS link and the plurality of sub-links comprise ten 10GBASE-R PCS links.

* * * * *